United States Patent
Li et al.

(10) Patent No.: US 9,844,916 B2
(45) Date of Patent: Dec. 19, 2017

(54) METHOD AND SYSTEM FOR SOLID OBJECT MANUFACTURING

(71) Applicants: INVENTEC APPLIANCES (PUDONG) CORPORATION, Shanghai (CN); INVENTEC APPLIANCES CORP., New Taipei (TW); INVENTEC APPLIANCES (SHANGHAI) CO. LTD, Shanghai (CN)

(72) Inventors: Li Li, Shanghai (CN); Li Yu, Shanghai (CN); Shih-Kuang Tsai, Shanghai (CN)

(73) Assignees: Inventec Appliances (Pudong) Corporation, Shanghai (CN); Inventec Appliances Corp., New Taipei (TW); Inventec Appliances (Shanghai) Co., Ltd., Shanghai (CN)

( * ) Notice: Subject to any disclaimer, the term of this patent is extended or adjusted under 35 U.S.C. 154(b) by 323 days.

(21) Appl. No.: 14/710,023

(22) Filed: May 12, 2015

(65) Prior Publication Data

US 2016/0114534 A1    Apr. 28, 2016

(30) Foreign Application Priority Data

Oct. 24, 2014 (CN) .......................... 2014 1 0578908

(51) Int. Cl.
| | |
|---|---|
| *B33Y 30/00* | (2015.01) |
| *B29C 67/00* | (2017.01) |
| *B33Y 10/00* | (2015.01) |
| *B33Y 50/02* | (2015.01) |

(52) U.S. Cl.
CPC ...... *B29C 67/0088* (2013.01); *B29C 67/0059* (2013.01); *B33Y 10/00* (2014.12); *B33Y 30/00* (2014.12); *B33Y 50/02* (2014.12)

(58) Field of Classification Search
CPC ...... B29C 67/0059; B33Y 10/00; B33Y 30/00
See application file for complete search history.

(56) References Cited

U.S. PATENT DOCUMENTS

| | | | | |
|---|---|---|---|---|
| 6,460,958 B2 * | 10/2002 | Kubo | ..................... | B41J 3/4073 347/2 |
| 6,612,824 B2 * | 9/2003 | Tochimoto | .............. | B29C 41/36 425/130 |

OTHER PUBLICATIONS

Sajadi, Auto-Calibration of Multi-Projector CAVE-like Immersive Environments, Jun. 2011, Transaction on Visualization and Computer Graphics, vol. 17, pp. 1-13.*

* cited by examiner

*Primary Examiner* — Christina Johnson
*Assistant Examiner* — Kelsey C Grace
(74) *Attorney, Agent, or Firm* — Muncy, Geissler, Olds & Lowe, P.C.

(57) ABSTRACT

A solid object manufacturing system comprises: a controlling device, a solid object manufacturing device and a projecting device. The control device generates a solid object model and then divides the model into a plurality of layer images. The control device then adjusts the height of a lifting table of the solid object manufacturing device and controls the projecting device to project one of the layer images on the lifting table synchronously, so as to guide user to form an article by using a printing module of the solid object manufacturing device. The solid object manufacturing system guides user to complete the article by projecting the layer images and adjusting the height of the lifting table.

4 Claims, 4 Drawing Sheets

METHOD AND SYSTEM FOR SOLID OBJECT MANUFACTURING

CROSS-REFERENCE TO RELATED APPLICATIONS

The present invention claims benefit and priority of China Patent Application No. CN 201410578908.0, filed on Oct. 24, 2014, which is herein incorporated by reference in its entirety.

BACKGROUND OF THE INVENTION

Technical Field

The present invention relates to a system and method for solid object manufacturing, and more particularly to a system and method for solid object manufacturing in 3D-printing technologies.

Description of the Prior Art

Recently, 3D-printing has been extensively discussed, and is called by media as an emerging commercial means for a new wave of "maker evolution". 3D-printing is a type of rapid prototyping, in which a digital solid model generated by a computer is output to a slicing software (e.g. the principle of geographic contour lines, the contour of the solid model at a slice level is determined, thereby the contour data of a plurality of slices is attained), a G-code (including parameters of movements and printing of the 3D printer) is then output as a blueprint for the 3D printer to perform printing. A printing nozzle of the 3D printer is typically disposed on a driving mechanism capable of performing 3-dimensional movements. Via the control of the G-code, the printing nozzle and the driving mechanism can perform fine 3-dimensional movements and object printing. Further, through the control of the G-code, the printing nozzle may output solid, semisolid, liquid, semi-liquid or powder materials which are curable, so as to build a desired object in a laminated manner.

For solid object manufacturing purposes, existing domestic or commercial 3D printers are typically implemented with a printing nozzle which is movable in multiple dimensions, wherein a multi-dimensional driving mechanism of the printing nozzle is typically consisted of transmission components, such as stepper motors on respective axes, guide rods, inter-axial connecting mechanisms, gears and driving belts, as well as a movement controller. In addition, one printing nozzle is responsible for one material of printing. Thus, the existing domestic or commercial 3D printers normally output single material object. If an object is required to be formed with multiple materials or colors, it is implemented by using multiple printing nozzles, or by changing the printing materials. The former means may increase the price of the 3D printer due to a more complicated printing nozzle mechanism and material supply controlling method, while the latter may increase the time cost for 3D-printing since the printer operator needs to frequently load/unload printing nozzles for material changing. As a consequence, it is often found that creations of multiple colors or materials are not implemented easily when using the existing domestic or commercial 3D printers.

Moreover, the users may encounter design problems during the step of digital modeling with a computer. If the users are not familiar with methods or techniques related to modeling or drafting, modifying or adding model templates, it causes the users technical difficulties in entering the field of 3D printing. The aforementioned issues may be significant disturbances for those who make or improve creations by means of 3D printing.

SUMMARY OF THE INVENTION

In view of the problems above, the present invention provides a method and a system for solid object manufacturing implemented with a controlling device, a solid object manufacturing device and a printing device. The controlling device generates a solid object model and generates a plurality of layer images of the solid object model. The controlling device adjusts a height of a lifting table of the solid object manufacturing device and controls the projecting device to project a layer image corresponding to the current lifting table height on the lifting table synchronously, so as to guide the user to form articles by using a printing module of the solid object manufacturing device. The solid object manufacturing system will guide the user to accomplish solid object creations by projecting the layer images and adjusting the height of the lifting table.

The solid object manufacturing method and system according to the present invention enable the user to participate in the solid object manufacturing rather than just watch the machine to perform the manufacturing, so that the user will have a sense of achievement.

The solid object manufacturing method and system according to the present invention may be applied to some solid object manufacturing processes which cannot be fabricated by machines, such as cream decoration in food production, thereby reducing the difficulty of handworks.

According to the aforementioned objectives, the present invention provides the solid object manufacturing system, comprising: a projecting device having at least one projecting module; a solid object manufacturing device having a lifting table, a controlling module, a printing module and a work platform, the lifting table disposed in a hole at the center of the work platform being electrically connected to the controlling module via a controlling interface, the printing module having a plurality of spraying nozzles respectively filled with different colors of materials; and a controlling device communicated with the projecting device via a projection transmitting interface and electrically connected to the controlling module of the solid object manufacturing device via a control transmitting interface, wherein the projecting device is configured to project a layer image on the lifting table; the controlling module adjusts the height of the lifting table based on an instruction transmitted by the controlling device; and the spraying nozzles can be controlled by an user for performing any planar movements in the hole.

The present invention also provides the solid object manufacturing method, implemented by a solid object manufacturing system comprising a solid object manufacturing device, a projecting device, and a controlling device, the method comprises the steps of: generating a model of the solid object; generating a plurality of layer images of the solid object; projecting one of the layer images on a lifting table; manually forming a layer object corresponding to the projected one of the layer images; and determining whether the projected one of the layer images is the last one of the layer images, and transmitting a signal for ending the projecting if it is, or controlling the height of the lifting table and repeating the step of projecting one of the layer images on the lifting table if it is not.

DETAILED DESCRIPTION OF THE PREFERRED EMBODIMENTS

The present invention relates to system and method for solid object manufacturing. The present invention provides a 3D printing method, in which a user is guided step by step to perform printing to accomplish solid object manufacturing by using slicing projections that are projected by a projecting device to a manufacturing apparatus. The image algorithm, database types, communication mechanisms, and machine structures required in such system or method are not main points of the present disclosure and will not be described in detail.

Figure 1:
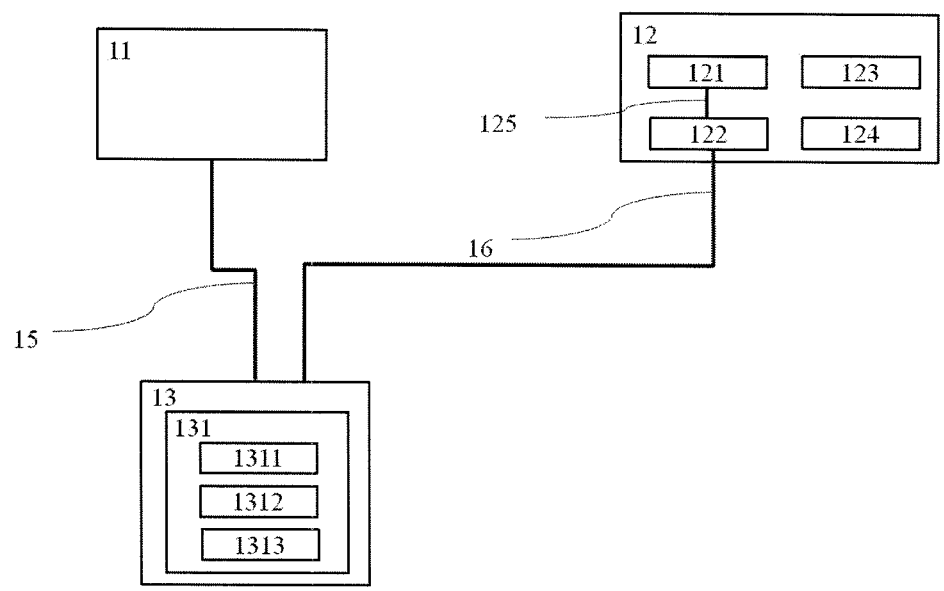
FIG. 1 is a schematic block diagram of a solid object manufacturing system according to an embodiment of the present invention.

Please refer to FIG. 1, which is a block diagram of a solid object manufacturing system 1 according to a first embodiment of the present invention. As shown in FIG. 1, the solid object manufacturing system 1 of the present invention comprises a projecting device 11, a solid object manufacturing device 12 and a controlling device 13. The projecting device 11 is communicated with the controlling device 13 via a projection transmitting interface 15. The solid object manufacturing device 12 is electrically connected to the controlling device 13 via a control transmitting interface 16. The projection transmitting device 15 and the control transmitting interface 16 may be wired or wireless.

Figure 2A:
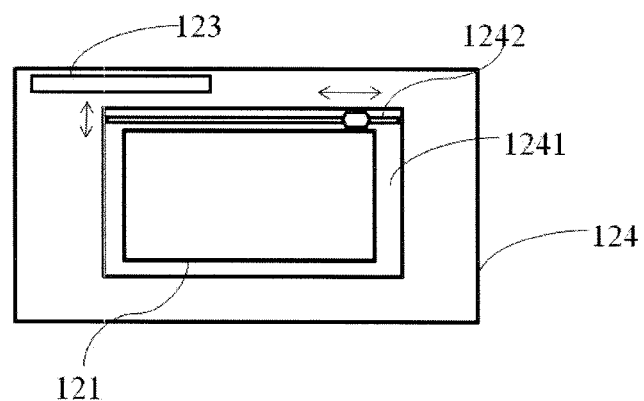
FIG. 2A is a schematic top view of the solid object manufacturing system according to an embodiment of the present invention.
Figure 2B:
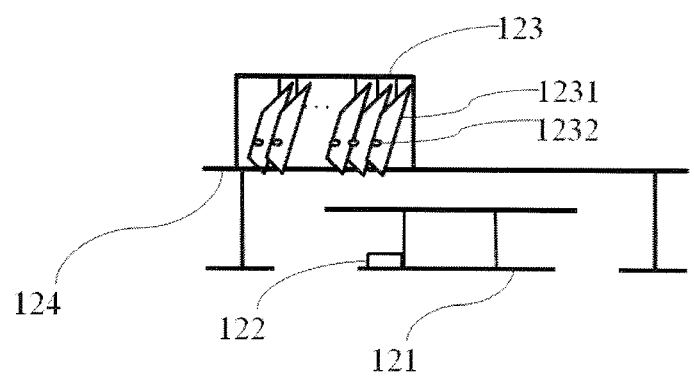
FIG. 2B is a schematic side view of the solid object manufacturing system according to an embodiment of the present invention.

Please refer to FIG. 1, FIG. 2A and FIG. 2B. FIG. 2A are a schematic top view of the solid object manufacturing device 12 according to an embodiment of the present invention. FIG. 2B is a schematic side view of the solid object manufacturing device 12 according to an embodiment of the present invention. The solid object manufacturing device 12 includes a lifting table 121, a controlling module 122, a printing module 123 and a work platform 124, wherein the controlling module 122 is electrically connected on the lifting table 121 via a controlling interface 125, and is electrically connected to the controlling device 13 via the control transmitting interface 16. The controlling module 122 adjusts a height of the lifting table 121 based on instructions transmitted by the controlling device 13 via the control transmitting interface 16. The controlling module 122 may be constructed with transmitting components and controllers described in prior art. Functions and structure of the printing module 123 are similar to that of the printing nozzle in conventional 3D printers. However, in order to meet the requirement of multi-color manufacturing or multi-material output, the printing module 123 is provided with a plurality of spraying nozzles 1231 which can be filled with materials of various colors by the user. Each spraying nozzle 1231 is provided with a switch 1232 which is configured to control the material output. The work platform 124 is provided with a hole 1241 in its center for accommodating the lifting table 121. A hand supporting module 1242 is also provided in the hole 1241. The hand supporting module 1242 is constructed with biaxial sliding rail connecting rods and supporting pads disposed on the connecting rods for enabling the hands of the user to be supported on the supporting pads when holding the spraying nozzle 1231, and for performing any planar movement within the hole 1241, thereby printing materials on the lifting table 121 and performing manufacturing.

Figure 3A:
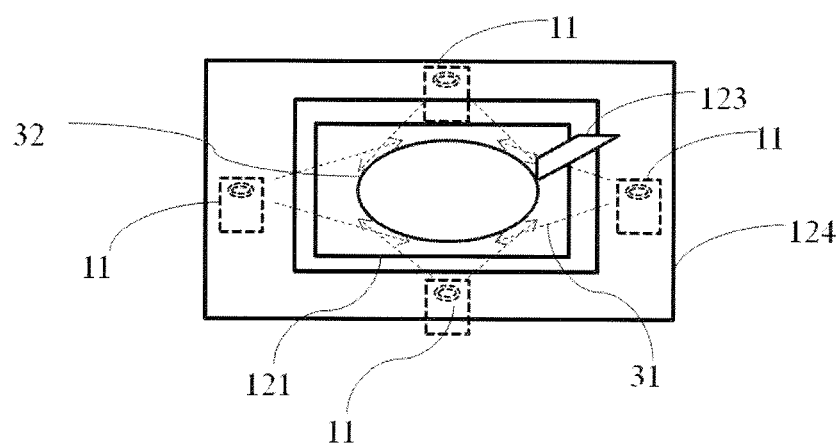
FIG. 3A is a schematic top view illustrating the multi-point short-throw projection according to an embodiment of the present invention.
Figure 3B:
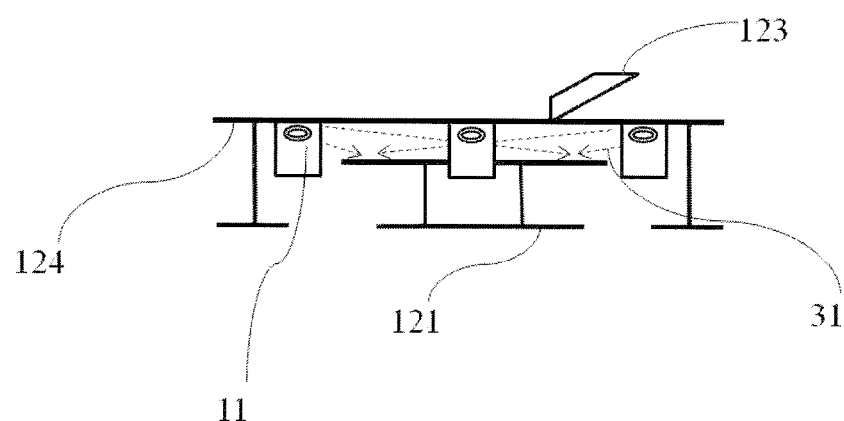
FIG. 3B is a schematic side view illustrating the multi-point short-throw projection according to an embodiment of the present invention.

The projecting device 11 may be a single projecting mechanism or may be consisted of a plurality of projecting mechanisms. In an embodiment, the projecting device 11 is disposed above the work platform 124 for projecting images downward on the lifting table 121. In other embodiments, the projecting device 11 is disposed under the work platform 124 for projecting images on the lifting table 121 in a multi-point short-throw projecting manner. The schematic top view and side view of multi-point short-throw projecting implementation of the projecting device 11 and the work platform 124 are shown in FIG. 3A and FIG. 3B, respectively. In the present embodiment, the projecting device 11 consisted of four projecting mechanisms is disposed under the work platform 124 for projecting. The projecting lights 31 irradiate the lifting table 121 and form a slice image 32.

The controlling device 13 includes an auxiliary application program 131, wherein the auxiliary application program 131 includes a modeling function 1311, a projecting function 1312 and a lifting table controlling function 1313. The modeling function 1311 includes functions of digital modeling and slicing. The user can not only use built-in solid model templates of the digital modeling function but also download two-dimensional (2D) patterns or three-dimensional (3D) patterns and create solid models by using the digital modeling function. The slicing function described in prior art sets a user-defined thickness or a recommended thickness generated by analyzing the solid model contour to be an unit of thickness to perform a slicing process for generating a plurality of layer models and sets the unit of thickness as a distance unit for subsequent operations of the lifting table control function and raising/lowering the height of the lifting table 121. In addition, the unit of thickness may also be predefined before analyzing the solid model contour.

The projecting function 1312 operates together with the lifting table controlling function 1313. First, the lifting table controlling function 1313 transmits an initialization instruction for the height of the lifting table 121 via the control transmitting interface 16. Through the operation of the controlling module 125, the height of the lifting table 121 is adjusted to be equal to the height of bottom of the hand supporting module 1242 of the work platform 124 minus the unit of thickness, which is set as the initial height of the lifting table 121. The purpose thereof is to prevent the planar movement of the hand supporting module 1242 to damage the object when the user uses the hand supporting module 1242. The projecting function 1312 projects a first model which is counted from the bottom layer of the plurality of sliced models on the lifting table 121 via the projection transmitting interface 15 to form a first layer image 32 of the object. Next, such process is repeated, and the lifting table controlling function 1313 lowers the height of the lifting table 121 by one unit of thickness each time, and maintains the distance between the height of the lifting table 121 plus the height of stacked objects and the height of the bottom of the hand supporting module 1242 of the work platform 124 as the unit of thickness. According to the height parameters of the lifting table controlling function 1313, the projecting function 1312 projects the corresponding layer images 32 on the lifting table 121. Besides, the controlling device 13 displays a location of the current layer image in the entire model on a screen and displays the next layer image in advance, so that the user understands the contour change from the current layer to the next layer and performs manufacturing. The controlling device 13 may be a laptop or a personal computer (PC).

From the description above, the solid object manufacturing system 1 integrates the projecting device 11, the solid object manufacturing device 12 and the controlling device 13, and guides the user to accomplish solid object creations by projecting the layer images and adjusting the height of the lifting table 121. During the process, the user may even adjust the material printing pattern to alternatively improve the original solid model. For example, in sand carving or food art creation, the user may not need to modify the template to make solid object creations which is partially different from the original solid model template. This is an effect of free creation that the existing 3D printer cannot achieve.

Figure 4:
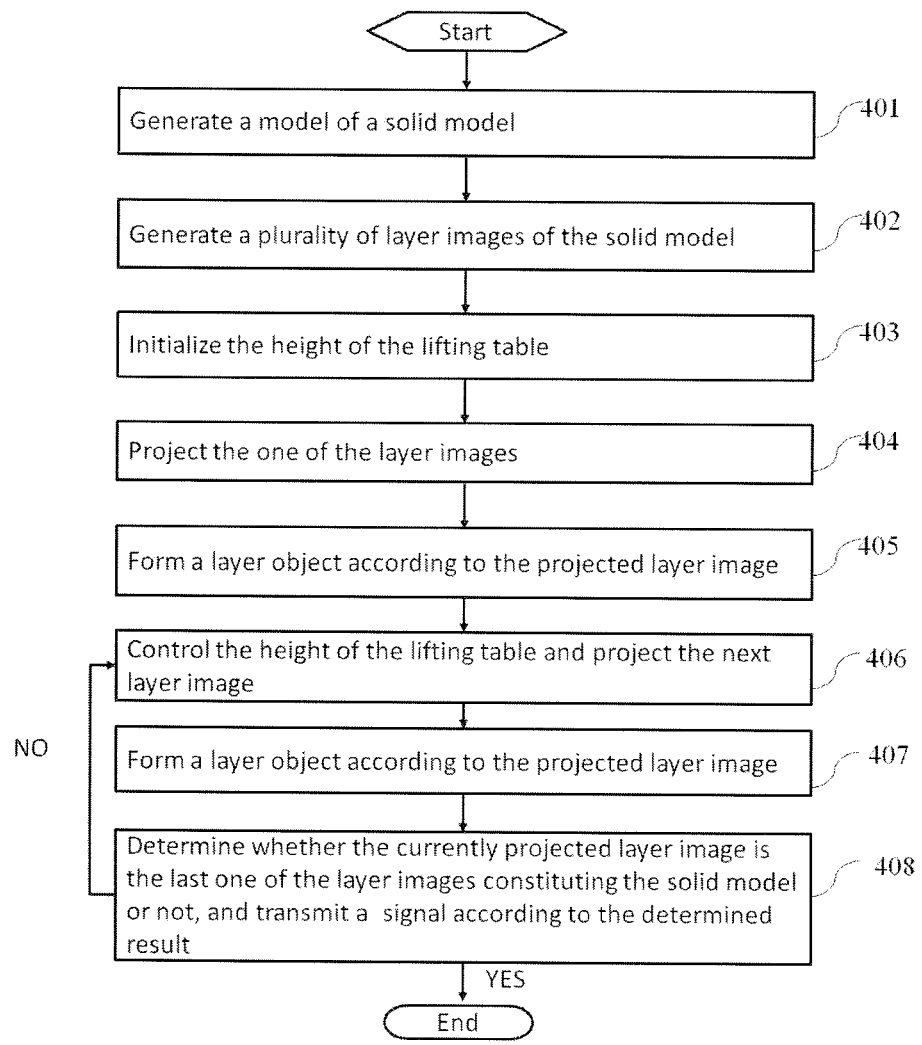
FIG. 4 is a flow chart illustrating a solid object manufacturing method of the present invention.

Regarding the solid object manufacturing method, please refer to FIG. 4. FIG. 4 is a flow chart illustrating the solid object manufacturing method according to an embodiment of the present invention. The concept thereof includes the operational method of the aforementioned solid object manufacturing system 1, which can be referred to FIGS. 1-3 and corresponding components therein. The solid object manufacturing method comprises the following steps:

Step 401: generating a model of the solid object in the controlling device 13. The controlling device 13 includes the auxiliary application program 131. The auxiliary application program 131 includes the modeling function 1311 having a digital modeling function. The user can not only apply or modify the built-in solid model templates but also download 2D or 3D patterns and create solid models by using the digital modeling function to perform conversion.

Step 402: generating a plurality of layer images of the solid model in the controlling device 13. The auxiliary application program 131 includes the modeling function 1311. In addition to the digital modeling function, the modeling function 1311 also includes the slicing function which can slice the solid model generated in the step 401 and generate a plurality of layer models by using an unit of thickness which is a user-defined thickness or a recommended thickness generated by analyzing the solid model contour. The unit of thickness is further set as a distance unit for subsequent operations of the lifting table controlling function 1313 and raising/lowering the height of the lifting table 121. In addition, the unit of thickness may also be predefined before analyzing the solid model contour.

Step 403: the controlling device 13 initializes the height of the lifting table 121. The controlling device 13 includes the auxiliary application program 131. The auxiliary application program 131 includes the lifting table controlling function 1313. The lifting table controlling function 1313 transmits an initialization instruction for the height of the lifting table 121 via the control transmitting interface 16. Through the operation of the controlling module 125, the height of the lifting table 121 is adjusted to be away from the bottom of the hand supporting module 1242 of the work platform 124 by the unit of thickness and set as the initial height of the lifting table 121. The purpose thereof is to prevent the planar movement of the hand supporting module 1242 to damage the object being manufactured when the user uses the hand supporting module 1242.

Step 404: the controlling device 13 controls the projecting device 11 to project a first layer image 32 on the lifting table 121. The controlling device 13 includes the auxiliary application program 131. The auxiliary application program 131 includes the projecting function 1312. The projecting function 1312 projects a first model which is counted from the bottom layer of the plurality of sliced models on the lifting table 121 via the projection transmitting interface 15 to form the first layer image 32 of the object.

Step 405: forming a layer object according to the layer image 32 projected on the lifting table 121. The user uses the spraying nozzle 1231 in the printing module 123 to form a solid layer object in a hand-drawn manner according to the layer image 32 projected on the lifting table 121. Also, the user may control the amount of material via the switch 1232, and may choose a different spraying nozzle 1231 for coating material with a different color.

Step 406: the controlling device 13 controls the height of the lifting table 121, and projects the next layer image 32 on the lifting table 121. When the lifting table controlling function 1313 adjusts the height of the lifting table 121, it adjusts the height of the lifting table 121 by one unit of thickness each time, so as to maintain the distance between the height of the lifting table 121 plus the height of stacked objects and the height of the bottom of the hand supporting module 1242 of the work platform 124 as the unit of thickness. According to the height parameters of the lifting table controlling function 1313, the projecting function 1312 projects the corresponding layer images 32 on the lifting table 121.

Step 407: forming a layer object according to the layer image 32 projected on the lifting table 121. Similarly, the spraying nozzle 1231 is employed in a hand-drawn manner for such process. The newly-formed layer object will be bonded to existing layer objects.

Step 408: the controlling device 13 determines whether the projected layer image 32 is the last one of the layer images 32 of the solid model, and transmits a signal for ending the projecting if it is, or repeat the step 406 if it is not.

In the meantime, the controlling device 13 also displays a location of the current layer image 32 in the entire model on the screen, and displays the next layer image 32 in advance, so that the user understands the contour change from the current layer to the next layer and performs to manufacture.

The solid object manufacturing method and system according to the present invention enable the user to participate in the forming of the solid object rather than just watch the machine to perform the manufacturing, so that the user will have a sense of achievement.

The solid object manufacturing method and system according to the present invention may be applied to some solid object manufacturing processes which cannot be fabricated by machines, such as cream decoration in food production. Conventionally, experience and skills are needed to accomplish such production, but the present invention can reduce the threshold thereof.

While the preferred embodiments of the present invention have been set forth above, they shall not be used to limit the scope of the present invention. Those skilled in the art may make alterations and modifications without departing from the spirit and scope of the present invention. Accordingly, the scope of the present invention is to be defined by the appended claims.

What is claimed is:

1. A solid object manufacturing system, comprising:
a solid object manufacturing device having a lifting table, a controlling module, a printing module and a work platform, the lifting table disposed in a hole at the center of the work platform being electrically connected to the controlling module, the printing module having a plurality of spraying nozzles respectively filled with different colors of materials, and the plurality of spraying nozzles performing any planar movements in the hole;
a projecting device having at least one projecting module for projecting a plurality of layer images of the solid object on the lifting table, and wherein the projecting device is disposed under the work platform for projecting the layer images on the lifting table by a multi-point short throw projecting manner; and
a controlling device electrically connected to the solid object manufacturing device and the projecting device, wherein the controlling module receives an instruction transmitted by the controlling device for adjusting the height of the lifting table.

2. The system of claim 1, further comprising:
a hand supporting module disposed in the hole of the work platform.

3. The system of claim 1, wherein the projecting device is disposed above the work platform for projecting the layer images on the lifting table by an up-to-down manner.

4. The system of claim 1, wherein each of the spraying nozzles has a switch.

* * * * *